INVENTORS.
Teruo Honjo
Hideo Takafuji

United States Patent Office 3,610,024
Patented Oct. 5, 1971

3,610,024
NONCONTACT DISPLACEMENT MEASURING
APPARATUS
Teruo Honjo and Hideo Takafuji, Tokyo, Japan, assignors to Nippon Steel Corporation, Tokyo, Japan
Continuation-in-part of application Ser. No. 660,736, Aug. 15, 1967. This application Aug. 12, 1969, Ser. No. 858,238
Claims priority, application Japan, Aug. 19, 1966, 41/54,591
Int. Cl. G01b *13/12*
U.S. Cl. 73—37.5                                       4 Claims

ABSTRACT OF THE DISCLOSURE

Apparatus for precisely measuring displacement of running or rotating objects without bringing the measuring piece into contact with the objects and includes body part preferably having a uniform cross-section interior fluid channel terminating in a small jetting orifice within a nozzle part devoid of any substantially effective exterior fluid pressure receiving or reaction surface adjacent the orifice. The unit of a fluid jetting body nozzle is supported in a floating state such that it may closely follow the surface to be measured, while a fixed clearance is maintained between the nozzle and the surface to be measured due to the reaction force of pressure fluid fed under constant pressure from the nozzle onto the surface to be measured, and further due to fluid reaction internally against a reaction surface opposite the orifice.

This application is a continuation-in-part of our copending application Ser. No. 660,736 filed Aug. 15, 1967, now abandoned.

BACKGROUND OF THE INVENTION

This invention relates to apparatus for measuring displacements of objects to be measured without bringing a measuring piece into contact with the objects.

An object of the present invention is to provide an apparatus for precisely measuring displacements and dimensions of running or rotating objects having comparatively flat surfaces or objects which should have no surface flaw.

There are known prior art air micrometers of the noncontact displacement measuring type which have many advantages including being very high in magnification, high also in measuring precision (such dimensional variation as about $1\mu$ can be measured therewith) and ease of handling, but due to a serious disadvantage of limited or narrow measuring ranges, their field of application has been comparatively limited. Therefore, in order to expand the measuring range of the air micrometer, various contrivances have already been made. However, even in the most practiced prior art apparatus today, the measuring range is still narrow, such as being up to $500\mu$.

The present invention is to provide an improved apparatus which will show performances equal to or better than those of the above-mentioned air micrometers in such fundamental conditions as the magnification and measuring precision and in the additional aspect as the operating efficiency. Additionally, it will meet a much greater measuring range and higher responsibility which cannot be expected from any conventional noncontact displacement measuring apparatus of this kind. In the present invention, the measuring range will be theoretically infinite as described later, and also the frequency responsibility is better than in the prior art air micrometers.

SUMMARY OF THE INVENTION

The apparatus of the present invention comprises a fluid jetting part including a nozzle portion preferably tapered to define a fluid jetting orifice at the forward end, or otherwise suitably formed as to have no substantial pressure-receiving surface at or normally adjacent said orifice. The apparatus further comprises a fluid jetting part supporting mechanism supporting said fluid jetting part so as to be able to be freely displaced, constant pressure fluid feeding means for feeding a constant pressure fluid to said fluid jetting part, an element for transmitting the displacement of the fluid jetting part to a displacement measuring part and a displacement measuring part for measuring said displacement, and further a mechanism for applying a balancing ofrce to said fluid jetting part being added as required.

In the present invention the fluid jetting nozzle having the jetting orifice is supported in a floating state so that, when a constant pressure fluid is fed to said nozzle and is jetted therethrough onto the surface to be measured, the fluid jetting part floats over the surface to be measured, and will continue to follow the same due to the reaction force of the fluid while always keeping a fixed balance clearance distance from the surface being measured. Consequently, the displacement of the surface to be measured is transmitted to the displacement measuring part without any contact having been made between the surface to be measured and the apparatus. Therefore, it is possible to expand the measuring range theoretically indefinitely by proper design of the apparatus.

Specifically, in the apparatus of the present invention, it is to be noted that, first, the fluid jetting part is not provided with a pronounced pressure receiving surface at its forward end; second, the fluid channel is provided with no throttling part, and the fluid jetting orifice part or nozzle is made to be a minimum cross-sectional part of the said channel; and third, the fluid feeding part is made to provide and feed a constant pressure air, and to be able to feed it in a sufficient flow.

By making the apparatus of the present invention as mentioned above, it is not only improved in the measuring precision, measuring range and responsibility, as compared with known prior art apparatus, but is also importantly characterized in that there is very little likelihood of causing contact or collision with the surface to be measured, and the apparatus is scarcely influenced by the temperature and roughness and the like of the surface to be measured, whereby the practicality thereof is remarkably increased and the range of application is greatly widened.

DESCRIPTION OF DRAWINGS

The features of the present invention shall be explained in the following, with reference to the drawings, in which like-reference characters designate like parts in the several figures, wherein.

PREFERRED EMBODIMENT

Figure 1:
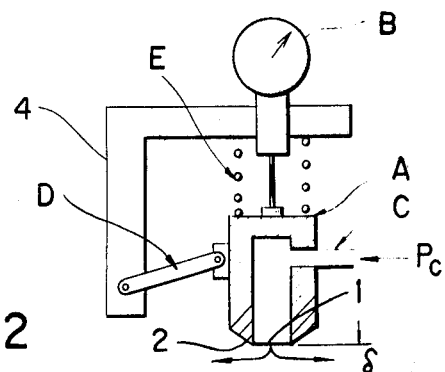
FIG. 1 is a view for explaining the principle of an apparatus of the present invention.

As understood from FIG. 1, which is a view for explaining the principle of the invention, the present measuring apparatus broadly comprises the fluid jetting part A; the displacement measuring part B; constant pressure fluid feeding means C; supporting mechanism D for the fluid jetting part A; and a balancing force-applying mechanism E.

The fluid jetting part A is supported by a fixed member 4 by means of the supporting mechanism D, and is supported in a floating state in the direction of displacement. The fluid jetting part A is characterized by the absence of any enlarged planar pressure receiving surface, and is provided only with a fluid jetting orifice 1 at its lower end. The constant pressure fluid feeding means C is provided in the upper part of the fluid jetting part A, and comprises a conduit leading from a suitable fluid pressure source (not shown) and connected with said part A. A constant pressure fluid Pc selected from such gases as air, nitrogen and argon or such liquids as water and oil, is fed through the conduit of said part C and is jetted through the nozzle orifice 1 at the lower end onto a surface 3 to be measured. In the present invention, the constant pressure fluid feeding means C must be capable of not only feeding a constant pressure fluid, but also to feed it in a sufficient amount of flow. Furthermore, it is to be noted that in the fluid channel extending from the inlet connection of the conduit of the fluid feeding means C to the fluid jetting orifice 1, no particular form of a throttling or reduced orifice forming part is used, but instead the channel may be of uniform cross-section and the nozzle part 2 formed between the forward end of part A and the surface 3 to be measured is made to converge down in size to the minimum cross-sectional area in the fluid channel, and may be of essentially conical or frusto-conical formation. A displacement measuring part B, which is a dial gauge in FIGS. 1 to 5, suitably supported by a proper method in the fixed part 4, is connected to the part A by suitable or proper means so that the amount of displacement of the fluid jetting part A may be transmitted to the displacement measuring part B. E represents a balancing force applying mechanism provided between the fluid jetting part A and the fixed part 4.

In measuring a displacement of an object by means of the apparatus of the present invention, when the said constant pressure fluid Pc is fed through the conduit of the constant pressure fluid feeding means C into part A, and said part A is positioned in a proper position for the surface 3 to be measured while the fluid is being jetted through the nozzle orifice 1, reaction force received from the fluid flowing out against said surface 3 and the balancing force E will be balanced with each other and part A will float up and remain stationary above the surface 3 while keeping a fixed clearance δ as determined by a combination of the fluid pressure Pc, the kind and temperature of said fluid, the magnitude of the balancing force, the shape of the fluid jetting part A and the condition of the surface 3 to be measured. If the surface 3 to be measured (the object to be measured) is displaced in such state, the part A will make the same displacement by following the displacement of the surface to be measured while maintaining the fixed clearance δ. As this displacement is transmitted to the displacement measuring part B, the amount of the displacement can be measured. Any of the various already known displacement measuring devices may be utilized for this displacement measuring part B, as, for example, a differential transformer, electric resistance type displacement measuring device, electric capacity type displacement measuring device, dial gauge, pointer micrometer or a pulse type displacement measuring device. Further, the fluid jetting part A and the displacement measuring part B are connected with each other through a suitable transmitting element. Not only an ordinary connecting rod may be used for such transmitting element, but also, as required, the constant pressure fluid may be blown onto the displaced surface of the fluid jetting part so that the fluid jetting part A and the displacement measuring part B may cooperate with each other while maintaining the fixed clearance.

Figure 2:
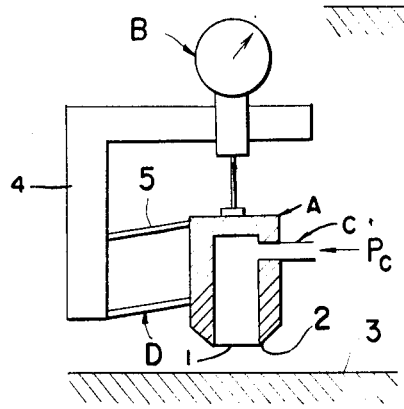
FIGS. 2 to 5 are respective views depicting apparatus of the present invention, wherein diverse manners of supporting the fluid jetting part are applied.
Figure 3:
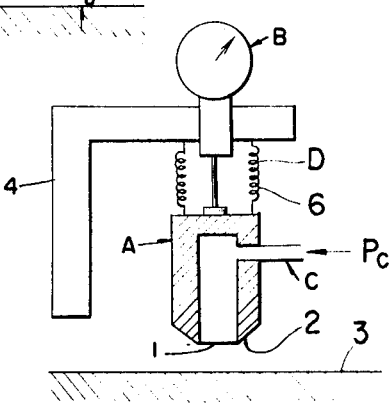
Figure 4:
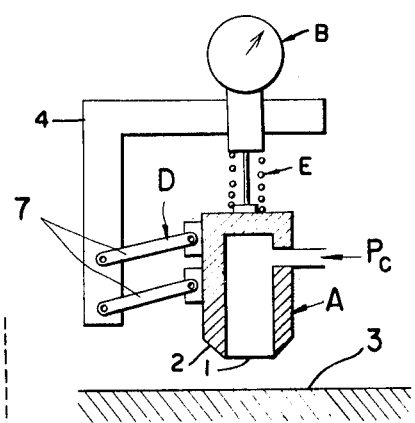
Figure 5:
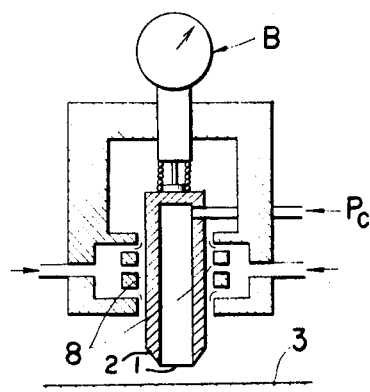

FIGS. 2 to 5 show embodiments of the supporting mechanism for the fluid jetting parts A. In FIG. 2, one or more leaf springs 5 are utilized to comprise the supporting mechanism D. In FIG. 3, the fluid jetting part A is supported with a pair of coil springs 6. In FIG. 3, the fluid jetting part A is supported with a pair of coil springs 6. In FIG. 4, the part A is supported with connecting links or rods 7. In FIG. 5, the fluid jetting part A is supported with means forming an air bearing 8.

The particular form of the supporting mechanism is not overly important to the principle; however, as a practical matter it should be made so as not to impart undue measurement error, and should be such as to repel and/or preclude the possibility of collision between the parts.

In the present invention, concerning the structure of the fluid jetting part A, various modifications are possible. However, said structure is fundamentally characterized in that it is not provided with any generally enlarged planar pressure receiving surface at its forward end, as readily seen in the drawing figures. This feature in cooperation with other preferred features, such as the fluid channel having no throttling part in it and the fluid feeding part means C being made so that the fluid may be fed in a sufficient amount, there occurs no contact with the surface to be measured, even though the said surface is relatively uneven, and an excellent temperature characteristic may be obtained. This is at least partly due to achieving good performance at high pressures and high temperatures because of not having a narrowed part in the nozzle conduit, there is no rise in temperature of the fluid issuing therefrom. Also, because of no enlarged planar-like pressure receiving surface on the outer nozzle end, there is no adverse influence by a temperature which often otherwise evolves between the measuring apparatus and surface to be measured.

Therefore, the apparatus of the present invention has a very wide range of application, and may be effectively applied also in a variety of situations including measuring an object, whether the surface is even or not, and measuring an object of high temperature or a moving or running object.

Further, for the balancing force applying mechanism E can be adopted from a variety of forms including a dead weight containing the weight of the fluid jetting part A, a resiliency of a spring, a fluid pressure or a magnetic force.

Figure 6:
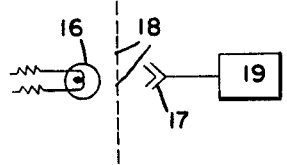
FIG. 6 is a view for explaining the principle of a pulse type displacement measurement.

FIG. 6 shows an alternative embodiment of a pulse type displacement measuring device to be used in the present invention, wherein a displacement rod or bar 13', as connected with the fluid jetting part A, is provided between a light source 16 and a photoelectric element 17 such as a phototransistor. A plurality of light-passing holes 18 are made at regular intervals in this rod 13. Therefore, whenever the fluid jetting part A is displaced and the hole 18 is positioned between the light source 16 and photoelectric element 17, pulses will be produced in the photoelectric element and will be counted by a pulse counter 19. Therefore, the amount of the displacement can be measured with the number of the pulses.

In a case of the structure such as shown in FIG. 3, if part 3 was made a base, and the displacement measuring part B was changed to a differential transformer and such apparatus were symmetrically provided above and below a running steel plate, to be measured, the results of the measurement would be as follows:

The diameter of the jetting orifice in the fluid jetting part A was $8_\phi$ mm. and the amount of float is large being on the order from several to more than 10 mm. The pressure jetting part A was suspended with a spring having a spring constant of 5000 g./mm. and nitrogen gas under 2 kg./cm.$^2$ was fed to it to measure the thickness of the plate, the thickness of the plate of a means thickness of 2 mm. could be continuously measured at a precision of $3\mu$. In such cases, the response or responsibility was 20 cycles/second. In measuring a steel plate running at a speed of 500 m./min. the fluid jetting part A did not touch with the steel plate, even though the steel plate flapped considerably up and down. Further, in the case of measuring a steel plate at a high temperature, there were shown good characteristics, and the error attributable to temperature was only $0.10\mu/°$ C. up to 1000° C.

Further advantageous characteristics of the present invention include a precision of ±0.002 mm. as against ±0.02 mm. of known prior art devices. A temperature characteristic of $10^{-5}$ mm./° C.; enabling constantly good performance and the ability to measure moving bodies; the ability to use the apparatus at high temperatures, and enabling measuring to be more efficiently performed without contact being made between the nozzle and the body being measured.

What is claimed is:

1. A noncontacting displacement measuring apparatus for measuring the displacement or variations of a workpiece to be measured without physically contacting the workpiece by the measuring apparatus, comprising:
   (a) a fluid-jetting nozzle (A) having wall means defining:
      (1) a generally central fluid channel;
      (2) a fluid-jetting orifice at one end in open communication with said channel; and
      (3) an imperforate, transverse reaction wall at an opposite end of said channel and nozzle, and formed integral therewith so as to provide an interior fluid pressure reaction surface directly opposite said orifice normal to the axis of said channel and nozzle and serving as the only effective surface against which the work-reflected fluid pressure reacts,
   said nozzle at the orifice end having a terminal portion of minimal cross-sectional area corresponding essentially to that of said orifice and being devoid of any substantially effective, exterior pressure-receiving reaction surface adjacent said orifice against which any of the work-reflected fluid pressure can effectively act;
   (b) a supporting mechanism (D) including means for exteriorly supporting said nozzle in a floating manner so as to be spaced or gapped closely adjacent a workpiece and including a balancing force-applying mechanism (E) against which said nozzle reacts, so as together to enable said nozzle to be freely displaced and to consistently maintain the space gap constant, responsive only to the direct jetting of a fluid at a fixed pressure through said nozzle and orifice, and reacting from the workpiece directly against said interior reaction surface;
   (c) constant pressure fluid-feeding means (C) including a conduit for feeding a constant pressure fluid to said channel and nozzle;
   (d) displacement measuring means (B) mounted on said supporting mechanism and operable directly by said floating nozzle for directly measuring the displacement of said fluid-jetting nozzle, and accordingly, the workpiece, and
   (e) said apparatus excluding any auxiliary pneumatic-activated mechanical means for indirectly effecting mechanically adjustment of said nozzle to effect a measurement caused by variations in the surface of said workpiece.

2. An apparatus as defined in claim 1 wherein said supporting means of paragraph (b) include a relatively stationary support and shiftable coupling device for shiftably interconnecting said nozzle and said stationary support; and said coupling device includes resilient means interposed between said stationary support and said nozzle to support the latter in a resilient manner.

3. Apparatus as defined in claim 1 wherein said displacement measuring means includes dial gauge means having a depending mechanical motion transmitting rod element engageable with said nozzle to transmit the amount of displacement.

4. Apparatus as defined in claim 1 wherein said displacement measuring means includes electrical light pulse generating and detecting means.

References Cited

UNITED STATES PATENTS

| | | | |
|---|---|---|---|
| 2,276,036 | 3/1942 | Hanna et al. | 73—37.7 |
| 2,982,124 | 5/1961 | Knobel | 73—37.7 |
| 3,194,055 | 7/1965 | Knobel | 73—37.5 |
| 3,321,838 | 5/1967 | Albertson, Jr. | 33—174 |
| 3,074,264 | 1/1963 | Polk | 73—37 |
| 3,405,556 | 10/1968 | Gonsalves et al. | 73—160 |

LOUIS R. PRINCE, Primary Examiner

W. A. HENRY II, Assistant Examiner